United States Patent [19]

Hyde et al.

[11] 4,302,802
[45] Nov. 24, 1981

[54] FLYBACK POWER SUPPLY REGULATOR

[75] Inventors: John W. Hyde, Parsippany; Dennis W. Gyma, Netcong, both of N.J.

[73] Assignee: Hewlett-Packard Company, Palo Alto, Calif.

[21] Appl. No.: 64,677

[22] Filed: Aug. 8, 1979

[51] Int. Cl.³ .......................................... H02M 3/335
[52] U.S. Cl. ....................................... 363/21; 363/97
[58] Field of Search .................. 323/17, DIG. 1, 283, 323/287, 288; 363/17, 21, 25, 26, 97, 98, 133, 134, 16, 131

[56] References Cited

U.S. PATENT DOCUMENTS 4,148,097  4/1979  Deisch .................................. 363/26
4,150,424  4/1979  Nuechterlein ........................ 363/26

FOREIGN PATENT DOCUMENTS 2445125  4/1976  Fed. Rep. of Germany ........ 363/26
2850629  5/1979  Fed. Rep. of Germany ........ 363/21

Primary Examiner—A. D. Pellinen
Attorney, Agent, or Firm—Donald N. Timbie

[57] ABSTRACT

A constant frequency switching-type power supply with pulse width modulation control in which the error signal is compared with an auxiliary ramp that starts with the clock pulses as well as with a current ramp signal and in which the clock pulses controlling the closing of the switches are delayed so as to avoid transfer of energy at no load that results from the inherent delay between the time when the current ramp crosses above the error signal and the time when the switches are opened.

8 Claims, 5 Drawing Figures

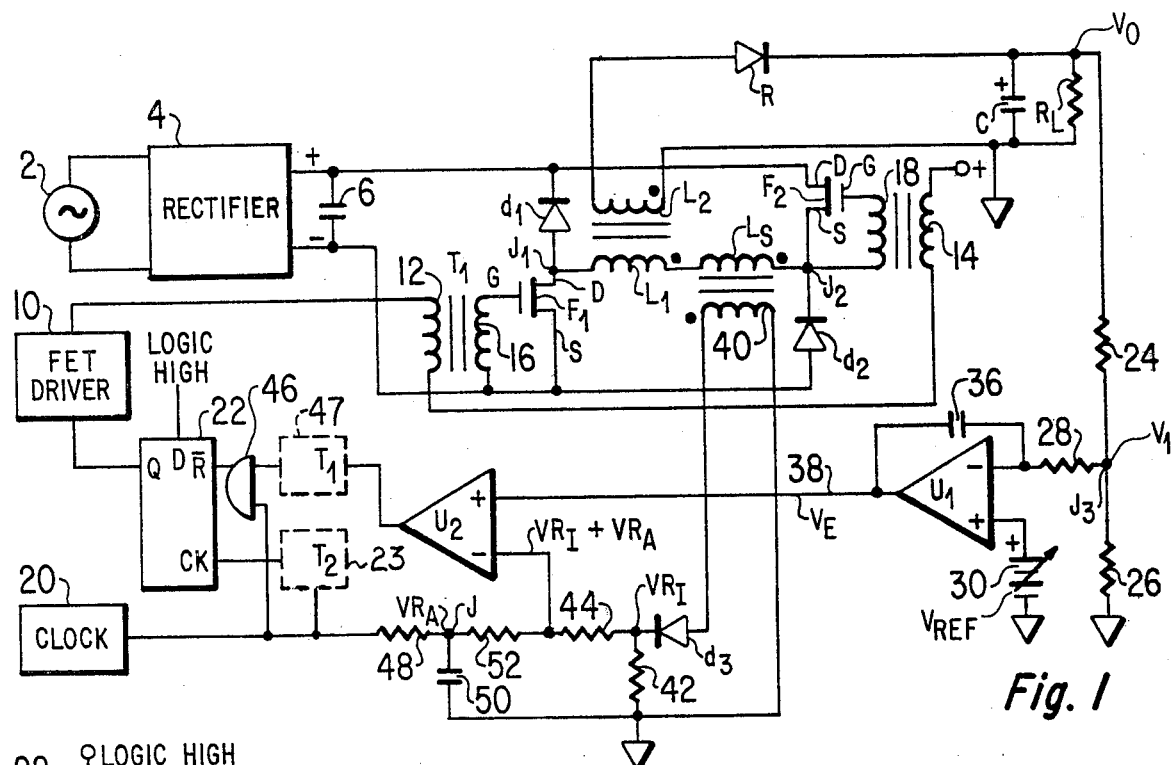
Fig. 1
Fig. 1A
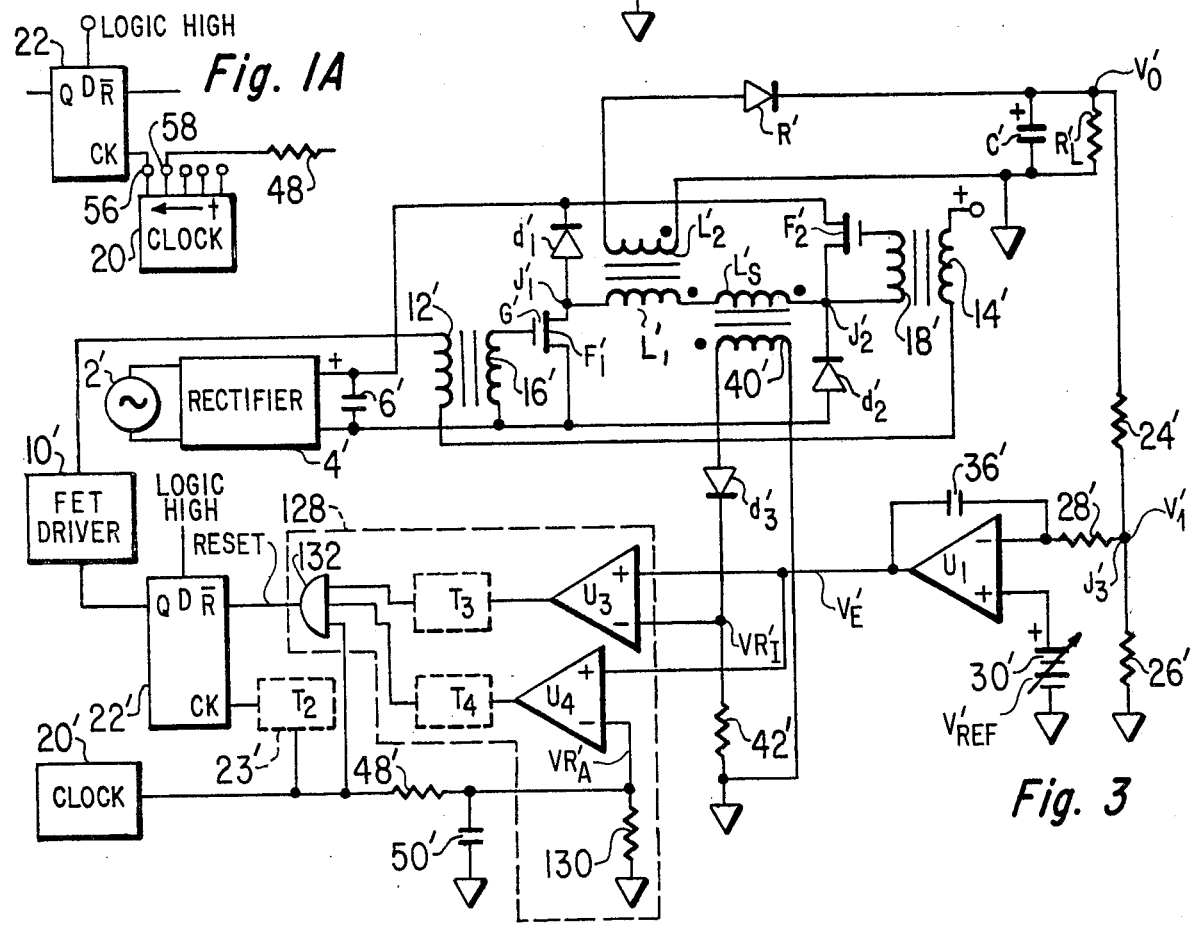
Fig. 3

FLYBACK POWER SUPPLY REGULATOR

BACKGROUND OF THE INVENTION

Flyback power supplies are comprised of a rectifier and filter for deriving an unregulated direct current voltage from the line or other source of alternating current voltage, a switch for connecting the direct current voltage across a first inductor, a second inductor magnetically coupled to the first, and a diode and a storage capacitor connected in series across the second inductor. Output power is derived by connecting a load in parallel with the output capacitor. When the switch is closed, an increasing current flows in the first inductor and no current flows in the second inductor because of the polarity with which the diode and the second inductor are connected. When, however, the switch is opened, the current supplied from the rectifier to the first inductor goes to zero and the magnetic field created by the current in the first inductor starts to collapse. This induces a voltage of opposite polarity in the second inductor so that the diode now conducts current that charges the output capacitor.

One way to regulate the output voltage is to close the switch at regularly spaced times and to control the intervals during which the switch remains closed. This method is commonly referred to as constant frequency operation with pulse-width modulation control. The switch closure interval is terminated when a ramp signal, VR, that is initiated at switch closure reaches a value that equals the value of an error signal $V_E$ that is proportional to the difference between the actual output voltage and the desired output voltage.

There is, however, an inherent and unavoidable delay of $T_1$ between the time when the ramp signal VR and error signal $V_E$ reach equality and the time when the switch can be opened. During this time $T_1$, the current in the first inductor increases so that when the switch is finally opened, the energy stored in the magnetic field of the first inductor and therefore the charge delivered subsequently to the storage capacitor are greater than required to supply the load by some finite amount. Under normal load, the charge thus erroneously added to the storage capacitor causes the feedback amplifier to lower the error voltage $V_E$. This shortens subsequent switch closure intervals and reduces the transferred charge to the required steady state level. As the load is decreased, the accommodation of the error caused by the delay $T_1$ can be attained by further reduction of the error voltage $V_E$ until such time that $V_E$ reaches a value of zero. No further reduction of the switch closure interval is then possible and the switch must remain closed for a minimum time of $T_1$ seconds every time that it is closed. Because a finite amount of charge is transferred upon each switch closure, accurate regulation of the system at no load is not attainable since the average charge required at no load is zero. If the system is required to operate at virtually no load, it must change to a constant pulse width, variable frequency mode of operation, which is often undesirable due to the increased difficulty of filtering the lower frequencies that result.

BRIEF DISCUSSION OF THE INVENTION

One way of avoiding the erroneous introduction of energy of the first inductor in accordance with this invention may be briefly described as follows. As in former systems, the switch applying unregulated DC voltage to the first inductor is closed by switch control means in response to a certain portion of the pulses from a clock, such as the rising edge, and the switch is opened by the switch control means and a comparator $T_1$ seconds after the ramp signal VR exceeds the error signal $V_E$. In accordance with the invention, the time between the rising edge of a clock pulse and the earliest time at which the switch control means can close the switch is delayed by a time $T_2$ that is greater than $T_1$.

Since, as previously noted, the ramp VR is initiated by the same portion of a clock pulse as the switch closure means, the closing of the switch is delayed until $T_2$ seconds after the start of the ramp VR.

If the ramp signal VR that starts increasing at the beginning of the clock pulse is derived by integrating the undelayed clock pulse or the equivalent, it is only necessary to add sufficient delay to ensure that $T_2$ is greater than $T_1$.

However, if regulation is achieved for most of the load range by using a current ramp $VR_I$ that is proportional to the current in the primary winding of the transformer, the switch closure cannot be delayed with respect to the start of the current ramp $VR_I$ because they must occur at the same time. It is therefore necessary to provide an auxiliary ramp $VR_A$ that is similar to the ramp signal VR used in prior systems for regulation at all loads. The switch can be opened when the sum of the current ramp $VR_I$ and the auxiliary ramp $VR_A$ equals the error voltage $V_E$, or it can be opened when either ramp equals the error voltage.

In a manner to be described more fully below, the circuit just described eliminates the introduction of a finite, minimum and erroneous amount of energy into the system under no load and permits the amount of energy transferred to be gradually increased from zero as the load increases, while maintaining constant frequency operation.

THE DRAWINGS

FIG. 1 is a schematic diagram of one form of the invention;

FIG. 1A is an alternative to the portion of FIG. 1 that introduces the delay $T_2$;

Figure 2:
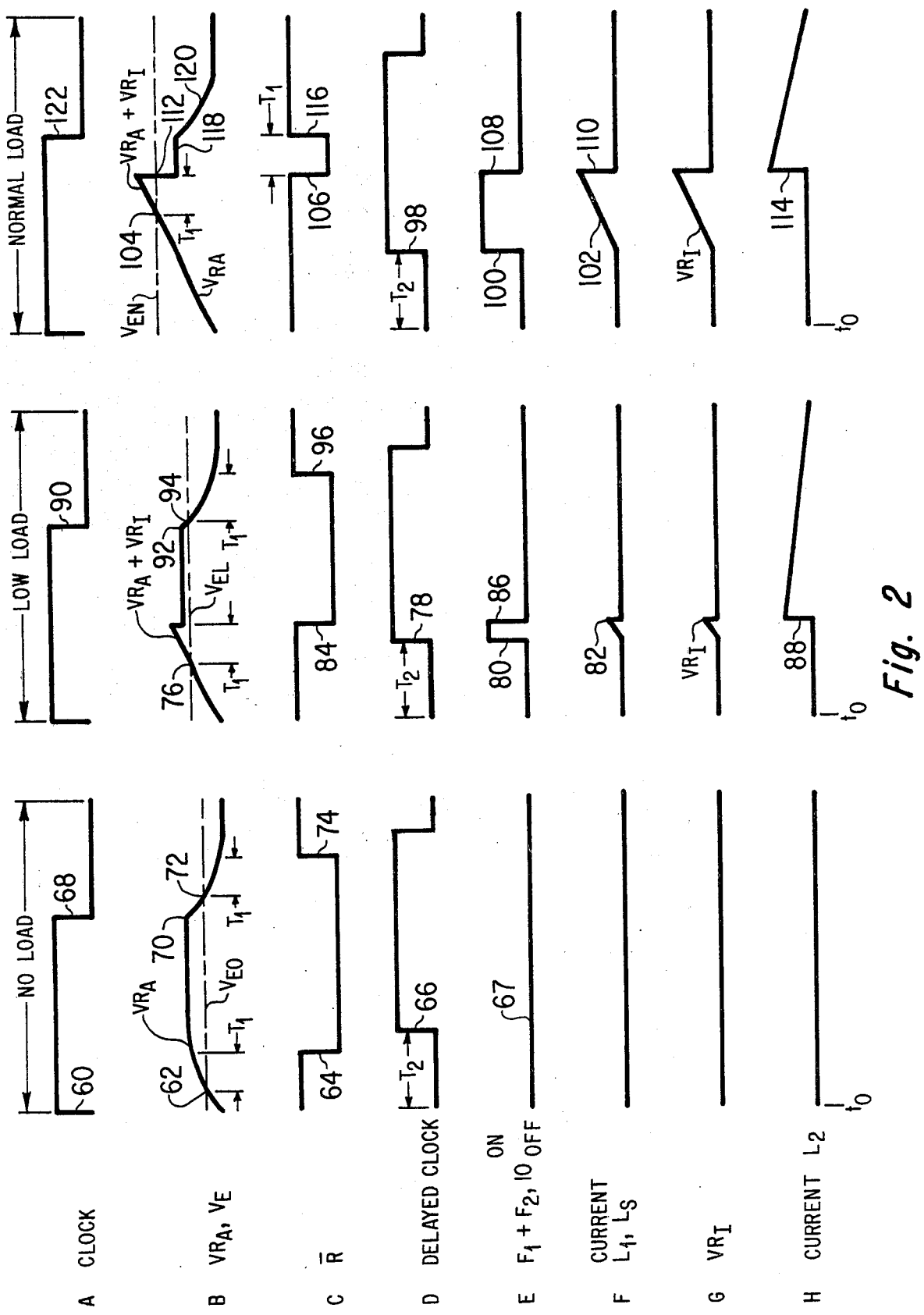

FIG. 2 is a series of graphs illustrating the operation of the form of the invention shown in FIG. 1 for no load, low load and normal load conditions, in which
  graph A represents the clock pulses,
  graph B represents the error signal and the composite ramp signal that consists of the ramp signal produced by the integration of the clock pulses of graph A added to the current ramp of graph G,
  graph C represents the voltage applied to the reset input of a D-type flipflop,
  graph D represents the clock pulses delayed by a time $T_2$,
  graph E represents the operation of the switches,
  graph F represents the current in the first inductor,
  graph G represents the current ramp, and
  graph H represents the current in the second inductor;

FIG. 3 is a schematic diagram of an alternative form of the invention; and

Figure 4:
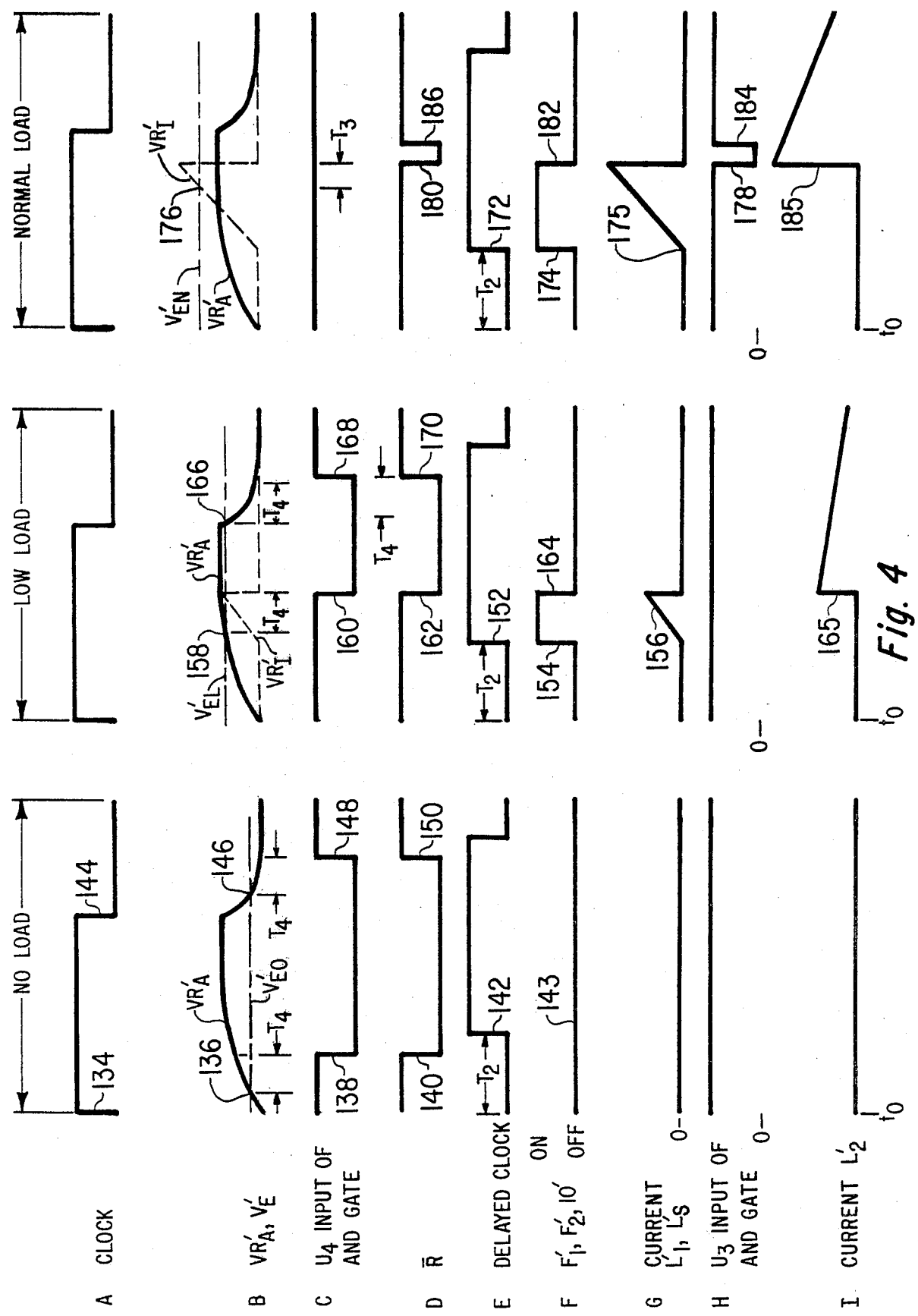

FIG. 4 is a series of graphs illustrating the operation of the form of the invention shown in FIG. 3 for no load, low load and normal load conditions, in which
  graph A represents the clock pulses, graph B represents the error signal, the ramp signal produced by integration of the clock pulses of graph A and the current ramp, graph C represents the voltage applied to one input of the AND gate, graph D represents the voltage applied to the reset input of a D-type flipflop, graph E represents the clock pulses of the graph A delayed by $T_2$, graph F represents the operation of the switches, graph G represents the current in the first inductor, graph H represents the voltage applied to the other input of the AND gate, and graph I represents the current in the second inductor.

Basic Power Supply

The following description relates to the known components of the flyback power supply illustrated in FIG. 1. Alternating current voltage supplied from a source 2, which may be the power line, is applied to a rectifier 4 that produces an unregulated direct current voltage across an output that is connected across a filter capacitor 6. A switch comprised of a first series circuit formed by a diode $d_1$ and a field effect transistor $F_1$ and a second parallel series circuit formed by a field effect transistor $F_2$ and a diode $d_2$ are connected across the output of the rectifier 4. A first inductor $L_1$ and a current sensing inductor $L_S$ are connected in series between the junction $J_1$ of the diode $d_1$ and the FET $F_1$ and the junction $J_2$ of the diode $d_2$ and the FET $F_2$. A rectifier R and a storage capacitor C are connected in series across a second inductor $L_2$ that is magnetically coupled to the first inductor $L_1$. One side of the storage capacitor C is connected to ground and a load $R_L$ is connected across it.

Conduction between the source and drain electrodes, S and D, of the field effect transistors $F_1$ and $F_2$ is controlled by a field effect transistor driver 10. In the particular circuit shown, pulses of the current from the driver 10 pass through primary transformer windings 12 and 14 and induce voltage pulses in secondary windings 16 and 18 which are respectively connected between the gate and source electrodes of $F_1$ and $F_2$. The voltages induced in the secondary windings 16 and 18 charge the inherent capacitance associated with the gates of $F_1$ and $F_2$ so as to keep $F_1$ and $F_2$ in a conductive state until the gate capacitances are discharged with a pulse of opposite polarity.

When the field effect transistors $F_1$ and $F_2$ conduct, an increasing current flows from the positive side of the output of the filter capacitor 6 through the drain-to-source path of the transistor $F_2$, the current sensing inductor $L_S$, the first inductor $L_1$, and the drain-to-source path of the transistor $F_1$. During this time, a voltage is induced in the second inductor $L_2$, but no current flows to the storage capacitor C because of the polarity of the rectifier R. Nor does any current flow through the diodes $d_1$ and $d_2$.

In prior art circuits, the field effect transistors $F_1$ and $F_2$ are made to start conducting by connecting the square wave output of a clock 20 directly to the clock input, CK, of a D flip-flop 22 and connecting its Q output to the FET driver 10, but for reasons that will be explained, the output of the clock 20 is delayed in accordance with this invention by an amount $T_2$ indicated by the dashed rectangle 23.

Turning off the FETs $F_1$ and $F_2$ in order to maintain the output voltage at a desired value has been effected as follows. A voltage $V_1$ that is a predetermined fraction of the actual output voltage $V_0$ of the supply is derived at the junction $J_3$ of voltage dividing resistors 24 and 26 that are connected in series between the ungrounded side of the load $R_L$ and ground. The voltage $V_1$ is applied to the inverting input of an operational amplifier $U_1$ via a resistor 28. A reference voltage $V_{REF}$ *representing the same fraction of the desired output voltage as $V_1$* is of the actual output voltage is supplied by a source 30 to the non-inverting input of $U_1$. A capacitor 36 is coupled between the inverting input of $U_1$ and its output so as to produce an error voltage $V_E$ at the output of $U_1$ that is the integrated difference between $V_1$ and $V_{REF}$. The voltage $V_E$ is coupled from the output of $U_1$ to the non-inverting input of a comparator $U_2$ via a lead 38.

A current ramp having a voltage $VR_I$ that corresponds to the increase in current through the first inductor $L_1$ is supplied to the inverting input of the comparator $U_2$ by coupling that input to a winding 40 that is magnetically coupled to the current sensing inductor $L_S$. The particular coupling circuit shown is comprised of a diode $d_3$ and a resistor 42 connected in series from one end of the inductor 40 to its grounded end. A resistor 44 is connected between the ungrounded end of the resistor 42 and the inverting input of $U_2$. In the usual circuit, the resistor 44 is not used, but it provides isolation when the circuit of this invention is added.

The output of $U_2$ is connected to one input of an AND gate 46 via an inherent delay $T_1$ indicated by the dashed rectangle 47, and the output of the AND gate 46 is connected to the reset input $\overline{R}$ of the D flipflop 22. When the voltage of the current ramp $VR_I$ is less than the error voltage $V_E$, the output of $U_2$ is high so that there is no effect on the D flip-flop 22; but when the voltage of $VR_I$ exceeds the error voltage $V_E$, the output of $U_2$ becomes low and resets the D flipflop 22 after $T_1$ seconds. This causes the FET driver 10 to output a pulse of such polarity as to discharge the inherent capacitances, not shown, associated with the gates of the FETs $F_1$ and $F_2$ and make them nonconductive. When this occurs, the current through the inductors $L_1$ and $L_S$ ceases. The strengths of the magnetic fields respectively associated with $L_1$ and $L_S$ correspond to the value of the current at the moment when $F_1$ and $F_2$ are cut off. When the magnetic field of $L_1$ starts to collapse, it induces a voltage in the second inductor $L_2$ that is opposite in polarity to what it was before so that current can flow through the rectifier R into the storage capacitor C. The amount by which the capacitor C is charged depends on the value of current flowing in $L_1$ when $F_1$ and $F_2$ are cut off.

The pulses from the clock 20 are applied to the other input of the AND gate 46. From the rising edge to the descending edge of the clock pulses, the input of the AND gate 46 to which they are connected is maintained at a high level so that the $\overline{R}$ input of the D flipflop 22 will be at a high level if the output of $U_2$ is high. The descending edges of the clock pulses will lower the output of the AND gate 46 and the $\overline{R}$ input of the D flipflop 22 so as to cause the FETs $F_1$ and $F_2$ to cease conducting.

As previously noted, however, there is an inherent and unavoidable delay $T_1$ schematically represented by the dashed rectangle 47 between the time when $VR_I$ exceeds $V_E$ and the time when the FETs $F_1$ and $F_2$ are actually cut off so that the current in the first inductor $L_1$ continues to increase for the time $T_1$ causing a slight undesirable increase in the energy delivered to the storage capacitor C. Although the delay $T_1$ is represented by the dashed rectangle 47, it can be located at any point between the inputs to the comparator $U_2$ and the source-to-drain paths of $F_1$ and $F_2$. If the load is large, this has no appreciable effect on output voltage, but when the load is zero or very small, its effect can be significant.

Preferred Embodiment

In accordance with this invention, enough additional delay is introduced at any convenient point such as between the outputs of the clock 20 and the CK input of the D flipflop 22, as indicated by the dashed rectangle 23, to make the total delay $T_2$ between the clock 20 and the time when $F_1$ and $F_2$ turn on greater than the inherent delay $T_1$. Furthermore, if regulation is to be achieved with a current ramp $VR_I$, means are provided for generating an auxiliary ramp voltage $VR_A$ that increases from a zero value at the time when a rising edge of a clock pulse emerges from the clock 20 to a high state value more than $T_2$ seconds later. In the particular circuit shown, the auxiliary ramp is generated by integrating the output of the clock 20 with a series circuit to ground comprised of a resistor 48 and a capacitor 50. In this particular embodiment, the auxiliary ramp $VR_A$ at the junction J of the resistor 48 and the capacitor 50 is added to the current ramp $VR_I$ by connecting an isolating resistor 52 between the junction J and the inverting input of $U_2$.

The required amount of delay $T_2$ can be provided in a number of ways, e.g., as shown in FIG. 1A, the last tick of the clock 20, as indicated at 56, may be applied to the clock terminal of the D flipflop 22, and a previous tick, as indicated at 58, may be applied to the resistor 48.

General Operation of FIG. 1

In this circuit, the rising edge of a clock pulse does not reach the CK input of the D flipflop 22 until $T_2$ seconds after it emerges from the clock 20. During the delay period of $T_2$ seconds, the auxiliary ramp $VR_A$ is gradually increasing, and $T_1$ seconds after it crosses above the error voltage $V_E$, assuming a no load condition, the $\overline{R}$ input to the flipflop acquires a low state and prevents $F_1$ and $F_2$ from being turned on even if a rising edge of a clock pulse arrives at the CK input. Therefore, if the crossover occurs more than $T_1$ seconds before the delay period of $T_2$ seconds is up, $F_1$ and $F_2$ cannot be turned on during that particular clock pulse. As the load increases, however, the error voltage $V_E$ increases so that the auxiliary ramp $VR_A$ does not cross above $V_E$ until a time that is less than $T_1$ seconds before the end of the delay period $T_2$. Thus, at the end of the delay period, when the rising edge of a clock pulse reaches the CK input, the low state voltage produced at the output of $U_2$ when the crossover occurred has not reached the $\overline{R}$ input. As a result, the output of $U_2$ is high and causes the driver 10 to turn on $F_1$ and $F_2$ and permit current to flow in $L_1$ and $L_S$. When the low state voltage produced at the output of $U_2$ finally reaches the $\overline{R}$ input, the output Q becomes low and causes the driver 10 to turn off $F_1$ and $F_2$ and cut off the flow of current in $L_1$. This current can flow in $L_1$ and $L_S$ for a time equal to the difference between $T_1$ seconds and the time between the crossover of $V_E$ by $VR_A$ and the end of the delay period.

For larger loads, the error voltage $V_E$ is so large that the auxiliary ramp $VR_A$ cannot cross above it. Therefore, the arrival of a rising edge of a clock pulse at the CK input of the flipflop 22 causes the driver 10 to turn on $F_1$ and $F_2$ and permit current to flow. Then, $T_1$ seconds after the resulting current ramp $VR_I$ crosses above the error voltage $V_E$, $F_1$ and $F_2$ are turned off.

Specific Operation for FIG. 1

The detailed operation of the circuit of FIG. 1 will now be explained by reference to the graphs A-G of FIG. 2 in which the left-hand, middle and right-hand portions respectively illustrate steady state operation under no load, low load and normal load conditions. In explaining operation under each load condition, it shall be assumed that the rising edge of a pulse from the clock 20, which pulse is shown in graph A, occurs at $t_0$, that the capacitor 50 is not charged and that this condition has lasted for longer than $T_1$ seconds so that existence of an error voltage $V_{EO}$ causes the output of $U_2$ and the $\overline{R}$ input of the D flipflop 22 to be high.

Consider operation under no load. At $t_0$ when the rising edge 60 of a clock pulse of graph A emerges from the clock 20, both the auxiliary ramp $VR_A$ and the current ramp $VR_I$ have a zero value that is less than the error voltage $V_{EO}$ so that the output of $U_2$ is positive. Integration of the clock pulse of the graph A by the resistor 48 and the capacitor 50 produces an auxiliary ramp as shown by the curve $VR_A$ of graph B. When $VR_A$ crosses above the error voltage shown by the dash-dot line $V_{EO}$ of graph B at 62, the output of $U_2$ drops to a low state, and $T_1$ seconds later, the $\overline{R}$ input of the D flipflop 22 does likewise as indicated at 64 of graph C. The D flipflop 22 is assumed to have an overriding type of reset line $\overline{R}$, so that when the rising edge 66 of the delayed clock pulse of graph D at the CK input of the D flipflop 22 occurs at the end of the delay period $T_2$, the output Q remains low as indicated at 67 of graph E and prevents the driver 10 from turning on $F_1$ and $F_2$. As a result, no current flows in $L_1$ and $L_S$ as indicated in graph F, as is desired, and the current ramp in graph G is zero. For the same reason, as shown in graph H, no current flows in the second winding $L_2$. When the falling edge 68 of the clock pulse of graph A occurs, the auxiliary ramp $VR_A$ decays exponentially as shown at 70 of graph B, and $T_1$ seconds after it drops below $V_{EO}$ at 72, the output of $U_2$ returns to a high state as indicated at 74 of graph C so as to be ready for the next clock pulse.

Under low load, as illustrated by the central portion of the graphs of FIG. 2, the error voltage $V_{EL}$ shown in graph B is somewhat larger than $V_{EO}$ so that the auxiliary ramp $VR_A$ does not cross above it until the point 76 that is less than $T_1$ seconds before the end of the delay period $T_2$. The voltage applied to the $\overline{R}$ input of the flip-flop 22 remains in a high stage beyond the end of the delay period. Therefore, when the rising edge 78 of the graph D appears at the CK input at the very end of the delay period, it causes the driver 10 to output a high voltage as indicated at 80 of graph E. This turns on $F_1$ and $F_2$ so that current flows in $L_1$ and $L_S$ as indicated at 82 in graph F and produces a current ramp $VR_I$ of graph G. This ramp is added to the auxiliary ramp as indicated at $VR_A + VR_I$ of graph B. Although the current is necessary to provide output power, the current ramp $VR_I$ plays no role as it does not cause a change in the output of $U_2$. $T_1$ seconds after the point 76, the low state produced in the output of $U_2$ reaches the $\overline{R}$ input of the flipflop 22 as indicated at 84 of graph C causing the driver output to drop as indicated at 86 of graph E and turn off $F_1$ and $F_2$. Current then starts flowing in $L_2$ as indicated at 88 of graph H.

When the falling edge 90 of the clock pulse of graph A occurs, the auxiliary ramp $VR_A$ starts to decay exponentially at 92 of graph B, and it crosses below the error voltage $V_{EL}$ at 94. The output of $U_2$ returns to a high state but it takes $T_1$ seconds for this voltage to reach the $\overline{R}$ input of the D flipflop 22 as indicated at 96 of graph C. The circuit is now ready for the next clock pulse.

Under normal load conditions, illustrated by the portions of the graphs at the extreme right of FIG. 2, the auxiliary ramp $VR_A$ has insufficient amplitude to cross the greater error voltage $V_{EN}$ and so has no effect. When the rising edge 98 of a clock pulse of graph D arrives at the CK input of the D flipflop 22, the output Q becomes high and causes the driver 10 to assume a high state as indicated at 100 of graph E and turn on $F_1$ and $F_2$. Current starts flowing in $L_1$ and $L_S$ as indicated at 102 of graph F, and produces a current ramp $VR_I$ of the graph G that is added to the value of the auxiliary ramp $VR_A$ so as to form the composite ramp $VR_A+VR_I$ shown in graph B. When it crosses above the error voltage at 104, the output of $U_2$ falls to a low state, and $T_1$ seconds later, the low voltage reaches the $\overline{R}$ input of the flipflop 22 as indicated at 106 of graph C. This causes the output voltage of the driver 10 to drop as indicated at 108 of graph E and turn off $F_1$ and $F_2$. The current in $L_1$ ceases, 110 of graph F, and the current ramp $VR_I$ of graph G drops to zero so that the composite ramp voltage $VR_A+VR_I$ crosses below $V_{EN}$ at 112. Current now flows in $L_2$ as indicated at 114 of graph H. The output of $U_2$ regains its high state, and $T_1$ seconds later high voltage reaches the $\overline{R}$ input of the flipflop 22 as indicated at 116 of graph C so that the circuit is ready for the next cycle. The fact that the auxiliary ramp $VR_A$ continues at its maximum level as at 118 and decays to zero as at 120 of graph B following the falling edge 122 of graph A has no effect on the operation.

Alternative Embodiment

Components of FIG. 3 corresponding to those of FIG. 1 are designated by the same letters or numerals primed. All differences between FIG. 3 and FIG. 1 are contained within the dashed line 128.

Two comparators are used: $U_3$ compares the error voltage $V_E'$ that is applied to its "+" input with the current ramp $VR_I'$ applied to its "−" input; and $U_4$ compares the error voltage $V_E'$ applied to its "+" input with the auxiliary ramp $VR_A'$ that is coupled to its "−" input from the ungrounded ends of the capacitor 50' and a resistor 130 that is in parallel with it. The output of $U_3$ is coupled to one input of an AND gate 132, the output of $U_4$ is coupled to another input, and the output of the clock 20' is applied to a third input. The output of the AND gate 132 is connected to the $\overline{R}$ input of the D flipflop 21'. The inherent delays $T_3$ and $T_4$ that respectively represent the time between a crossover of voltages applied to the inputs of $U_3$ and $U_4$ and a resulting change in the state of the output of the FET driver 10' may be the same or different, but each is less than $T_2$. The connection of the clock 20' to the third input of the AND gate 132 serves to cut off conduction in the FETs $F_1'$ and $F_2'$ at the end of each clock pulse unless they have been turned off previously.

General Operation

When the error voltage $V_E'$ exceeds the voltage of the current ramp $VR_I'$ applied to the "−" input of $U_3$, the output of $U_3$ is in a high state, and when the error voltage $V_E'$ exceeds the voltage of the auxiliary ramp $VR_A'$ applied to the "−" input of $U_4$, its output is in a high state. When they are both in a high state, the output of the AND gate 132 and the $\overline{R}$ input of the D flipflop 22' are also high. If a rising edge of a pulse from the clock 20' reaches the CK input of the D flipflop 22' $C_2$, the output Q causes the driver 10' to make the field effect transistors $F_1'$ and $F_2'$ conductive so that current can flow through $L_1'$ and $L_S'$.

When $VR_I'$ exceeds $V_E'$, the output of $U_3$ falls to a low state, and when $VR_A'$ exceeds $V_E'$, the output of $U_4$ falls to a low state. The arrival of either or both of these low states at the respective inputs of the AND gate 132 $T_3$ and $T_4$ seconds later causes its output to become low. Under this condition, the Q output of the D flipflop 22' becomes low and causes the FET driver 10' to make $F_1'$ and $F_2'$ nonconductive, thereby cutting off current in $L_1'$ and $L_S'$.

Specific Operation

The detailed operation of the circuit of FIG. 3 will now be explained by reference to the graphs A–G of FIG. 4 in which the left-hand, middle and right-hand portions respectively illustrate steady state operation under no load, low load and normal conditions. In explaining operation under each load condition, it will be assumed that the rising edge of a pulse from the clock 20' which is shown in graph A occurs at $t_0$, that the capacitor 50' is not charged, and that this condition has lasted longer than either $T_3$ or $T_4$ seconds so that the inputs of the AND gate 132 are at the high state voltage of the respective ones of $U_3$ and $U_4$ to which they are connected.

Consider operation under no load. At $t_0$ when the rising edge 134 of a clock pulse of graph A emerges from the clock 20', both the auxiliary ramp $VR_A'$ and the current ramp $VR_I'$ have a zero value that is less than $V_E'$ so that the outputs of $U_3$ and $U_4$ as well as all three inputs and the output of the AND gate 132 have a high state. Integration of the clock pulse of graph A by the resistor 48' and the capacitor 50' produces an auxiliary ramp as shown by the curve $VR_A'$ of graph B. When $VR_A'$ crosses above the error voltage shown by the dashdot line $V_{EO}'$ of graph B at 136, the output of $U_4$ drops to a low state, and $T_4$ seconds later the input of the AND gate 132 to which it is connected does likewise as indicated at 138 of graph C. This causes the output of the AND gate 132 and the $\overline{R}$ input of the D flipflop 22 $\propto$ to become low as indicated at 140 of graph D. Thus, when the rising edge 142 of the delayed clock pulse in graph E that is delayed by $T_2$ seconds by the delay $T_2$ indicated by the dashed rectangle 23' reaches the CK input of the flipflop 22', its output Q remains low and prevents the driver 10' from turning on $F_1'$ and $F_2'$ as indicated at 143 of graph F. No current flows in $L_1'$ and $L_S'$ as indicated in graph G, as is desired. There being no current in $L_S'$, the value of the current ramp is zero so that the output of $U_3$ and the $U_3$ input to the AND gate 132 are high as indicated in graph H. When the falling edge 144 of the clock pulse of graph E occurs, $VR_A'$ decays exponentially; and when it drops below $V_{EO}'$ at 146, the output of $U_4$ becomes high. $T_4$ seconds later, as indicated at 148 of graph C and 150 of graph D, one input and the output of the AND gate 132 rise once more to a high state so as to be ready for any succeeding operation.

Under low load conditions, the voltage applied to the $\overline{R}$ input of the flipflop 22' is in a high state when a rising edge 152 of the wave of graph E appears at the CK input so that the output Q goes high and causes the driver 10' to output a voltage that causes $F_1'$ and $F_2'$ to conduct as indicated at 154 of graph F. Current then flows in $L_1'$ and $L_S'$ as indicated at 156 of graph G so as to start producing the current ramp $VR_I'$ in graph B. Shortly thereafter, the voltage of the auxiliary ramp $VR_A'$ crosses above the error voltage $V_{EL}'$ at a point 158, causing the output of $U_4$ to fall to a low state. $T_4$ seconds later, this low voltage arrives at an input of the AND gate 132 as indicated at 160 of the graph C. At the same time, the output of the AND gate 132 and the $\overline{R}$ input of the flipflop 22' fall to a low state as indicated at 162 of graph D. This causes the voltage of the output Q of the flipflop 22' and the output of the driver 10' to fall and turn off $F_1'$ and $F_2'$ as indicated at 164 of graph F. Current then ceases to flow in $L_1'$ and $L_S'$ and the current ramp $VR_I'$ falls to zero. Current now flows in $L_2'$ as indicated at 165 in graph I. The current ramp $VR_I'$ has no effect because it crosses above the error voltage $V_{EL}'$ at time greater than $(T_4-T_3)$ seconds later than $VR_A'$ crosses above the error voltage $V_{EL}'$. As a result, the output of $U_3$ and the $U_3$ input to the AND gate 132 remain in a high state as indicated in graph H, but as soon as the auxiliary ramp $VR_A'$ falls below the error voltage $V_{EL}'$ at 166 of graph B, the output of $U_4$ goes high and $T_4$ seconds later the input to the AND gate 132 rises to a high state as indicated at 168 of graph C. The output of the AND gate 132 goes high as does the $\overline{R}$ input of the flipflop 22' as indicated at 170 of graph D. The circuit is ready for the next cycle of operation.

It can be seen that current in $L_1'$ and $L_S'$ starts to flow at the rising edge 152 of graph E and continues for $T_4$ seconds after the auxiliary ramp $VR_A'$ crosses the error voltage $V_{EL}'$ at point 158 of graph B. If the error voltage $V_{EL}'$ is lower, the crossover occurs earlier and current flows for a less time; and if the error voltage $V_{EL}'$ is higher, the crossover occurs later and current flows for more time, thus providing the desired regulation.

Under normal load conditions illustrated by the portions of the graphs at the extreme right of FIG. 4, the auxiliary ramp $VR_A'$ of graph B has insufficient amplitude to cross the now greater error voltage $V_{EN}'$ and so has no effect. When the rising edge 172 of a delayed clock pulse of graph E arrives at the CK input of the flipflop 22', its output Q becomes high and causes the driver 10' to output a voltage indicated at 174 of graph F that turns on $F_1'$ and $F_2'$. Current starts flowing in $L_1'$ and $L_S'$ as indicated at 175 of graph G and produces a current ramp $VR_I'$ of graph B. When it crosses above $V_{EN}'$ at point 176 of graph B, the output of $U_3$ falls to a low state. $T_3$ seconds later, the low state voltage reaches an input of the AND gate 132 as indicated at 178 of graph H and causes its output to also fall. The $\overline{R}$ input of the flip-flop 22' falls as indicated at 180 of graph D and so does its Q output, thereby causing the driver 10' to assume a low voltage and turn off $F_1'$ and $F_2'$ as indicated at 182 of graph F. As seen in graph G, the current in $L_1'$ and $L_S'$ drops to zero so that $VR_I'$ also drops to zero as seen in graph B. This causes the output of $U_3$ to regain its high state and $T_3$ seconds later the voltage reaches an input of the AND gate 132 as indicated at 184 of graph H. Since both of its inputs are high, the output of the AND gate 132 is high and so is the $\overline{R}$ input of the flipflop 22', the latter being indicated at 186 of graph D. The circuit is now ready for the next cycle of operation. Note that the $U_4$ input to the AND gate 132 remains high because the auxiliary ramp $VR_A'$ never crosses above the error voltage $V_{EN}'$. As soon as the current ceases in $L_1'$, current starts flowing in $L_2'$ as indicated at 185 of graph I.

The delay $T_3$ that is of significance under normal load conditions is shown as being less than $T_4$, but both could be equal to $T_1$ of FIG. 1 as long as they are less than $T_2$. For ease in explanation, it has been assumed that the delays $T_2$, $T_3$ and $T_4$ are lumped and occur in the positions shown, but $T_3$ and $T_4$ include delay in the AND gate 132 as well as a certain amount of delay between the application of a change of state voltage to the $\overline{R}$ input of the D flipflop 22' and the time when the new voltage is effective, the delay in bringing the output Q to a low state being of greater interest. As in FIG. 1, the delay $T_2$ represents the time between a change in state at the output of the clock 20' and the time for that change in state to affect the conduction of $F_1'$ and $F_2'$.

Thus, the major difference between the circuits of FIGS. 1 and 3 is that in FIG. 1 the auxiliary ramp $VR_A$ and the current ramp $VR_I$ are added together before being compared with the error voltage $V_E$ in the comparator $U_2$ that controls the state of the $\overline{R}$ input of the D flipflop 22, whereas in FIG. 3 the ramps are separately compared with the error voltage by $U_3$ and $U_4$ that control the output of the AND gate 132 that is applied to the R input of the D flipflop 22'.

What is claimed is:
1. A power supply comprising
    input terminals to which a direct current voltage may be applied,
    a transformer having primary and secondary windings,
    switching means connected in series with said input terminals and said primary winding,
    a storage capacitor
    rectifying means coupled to said secondary winding and said storage capacitor so as to produce a rectified direct current voltage across said capacitor from any alternating current voltage appearing on said secondary winding,
    a clock for providing spaced pulses,
    means responsive to the pulses from said clock and having a predetermined delay for closing said switching means at the beginning of spaced intervals and for opening them at the end of the intervals or at an earlier time within the intervals if disabled,
    means for generating a ramp signal that increases in amplitude from a given value during said predetermined delay,
    means for deriving an error signal corresponding to the difference between the actual voltage across said storage capacitor and the voltage that is desired across said capacitor, and
    means for disabling said means for closing said switching means at a time that is less than said predetermined delay after said ramp signal attains a value corresponding to the value of said error signal.

2. A power supply as set forth in claim 1 having means for deriving a current ramp proportional to the current flowing in said primary winding and means for providing the sum of said current ramp and said ramp signal at the input of said disabling means.

3. A power supply as set forth in claim 1 having means for deriving a current ramp proportional to the current flowing in said primary winding and means for disabling said means for closing said switching means when said current ramp has a value corresponding to said error signal.

4. A power supply, comprising
input terminals to which a direct current voltage may be applied,
a transformer having primary and secondary windings,
switching means for coupling said primary winding to said input terminals,
a storage capacitor,
rectifying means coupled to said secondary winding and said storage capacitor with such polarity that it conducts when said switching means are open,
a source of spaced pulses,
switch control means responsive to said pulses for closing said switching means after a first delay following the occurrence of a pulse and keeping them closed for a time equal to the pulse duration unless disabled,
means for deriving a current ramp that increases in voltage with the current in said primary winding,
means for deriving an auxiliary ramp signal that increases in voltage during said first delays,
means for adding said current ramp and said auxiliary ramp signal,
means for deriving an error voltage representing the difference between the voltage actually across said storage capacitor and the desired voltage,
a comparator for comparing the values of the added ramps and the said error voltage, and
means coupling the output of said comparator to said switch control means so as to disable said switch control means when the value of the sum of said ramps equals said error voltage.

5. A power supply, comprising
input terminals to which a direct current voltage may be applied,
a transformer having primary and secondary windings,
switching means for coupling said primary winding to said input terminals,
a storage capacitor,
rectifying means coupled to said secondary winding and said storage capacitor with such polarity that it conducts when said switching means are open,
a source of spaced pulses,
switch control means responsive to said pulses for closing said switching means after a first delay following the occurrence of a pulse and keeping them closed for a time equal to the pulse duration unless disabled,
means for deriving a current ramp that increases in voltage with the current in said primary winding,
means for deriving an auxiliary ramp that increases in voltage during said first delays,
means for deriving an error voltage representing the difference between the voltage actually across said storage capacitor and the desired voltage,
a first comparator for comparing the voltage of said current ramp with said error voltage,
means for coupling the output of said first comparator to said switch control means so as to disable said switch control means when said current ramp voltage exceeds said error voltage,
a second comparator for comparing the voltage of said auxiliary ramp with said error voltage, and
means for coupling the output of said second comparator to said switch control means so as to disable said switch control means when said auxiliary ramp voltage exceeds the said error voltage.

6. A flyback power supply, comprising
input terminals between which an unregulated direct current voltage may be applied,
a transformer having primary and secondary windings,
a switch connected in series with said input terminals and said primary winding,
a storage capacitor,
a rectifier coupled to said secondary winding and said storage capacitor so as to produce a rectified direct current for charging said capacitor and producing a voltage across it when said switch is open,
a source of spaced pulses,
switch operating means for closing and opening said switch,
means responsive to a given portion of each of said spaced pulses for causing said switch operating means to close said switch after a first given time and to open it in response to another and later portion of each of said pulses,
means for generating an error signal proportional to the difference between the voltage across said capacitor and a desired voltage,
means for generating a ramp signal that starts increasing in value in response to said given portion of each of said pulses,
a comparator having first and second inputs and an output,
means for applying said error signal to said first input of said comparator,
means for applying said ramp signal to said second input of said comparator, and
means responsive to the output of said comparator occurring when said ramp signal attains a value equal to the value of said error signal for causing said switch operating means to open said switch after a second given time that is less than the first given time, said means for causing said switch operating means to open said switch overriding said means for causing said switch operating means to close said switch.

7. A flyback power supply as set forth in claim 6, comprising
means for limiting the value of said ramp signal at the end of said first given time so as to form an auxiliary ramp signal,
means for deriving a current ramp having an amplitude proportional to current in said primary winding, and
means for applying the sum of said auxiliary ramp signal and said current ramp to said second input of said comparator.

8. A flyback power supply as set forth in claim 6, comprising
a second comparator having first and second inputs and an output,
means for deriving a current ramp having an amplitude proportional to current in said primary winding, means for applying said error signal to said first input of said second comparator, means for applying said current ramp to said second input of said second comparator, and means responsive to the output of said second comparator occurring when said current ramp attains a value equal to the value of said error signal for causing said switch operating means to open said switch after a third given time that is less than said first given time, said means responsive to the output of said second comparator overriding said means for causing said switch operating means to close said switch.

* * * * *